United States Patent
Stehlik et al.

(10) Patent No.: US 12,480,546 B2
(45) Date of Patent: Nov. 25, 2025

(54) SHAFT BEARING RETAINER ASSEMBLY

(71) Applicant: RTX Corporation, Farmington, CT (US)

(72) Inventors: Eric Stehlik, West Hartford, CT (US); James B. Coffin, Windsor, CT (US); Todd A. Davis, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 116 days.

(21) Appl. No.: 18/380,020

(22) Filed: Oct. 13, 2023

(65) Prior Publication Data

US 2025/0122909 A1    Apr. 17, 2025

(51) Int. Cl.
F16C 35/063    (2006.01)

(52) U.S. Cl.
CPC ........ *F16C 35/063* (2013.01); *F16C 2360/23* (2013.01)

(58) Field of Classification Search
CPC ......... F16C 35/06; F16C 35/063; F16C 35/12
See application file for complete search history.

(56) References Cited

U.S. PATENT DOCUMENTS

| | | | |
|---|---|---|---|
| 2,836,473 A * | 5/1958 | Tydeman | F16C 25/083 384/563 |
| 4,331,210 A | 5/1982 | Petrak | |
| 4,613,240 A * | 9/1986 | Hagelthorn | F16C 19/548 384/585 |
| 5,795,037 A * | 8/1998 | Hagelthorn | B60B 27/02 301/124.1 |
| 6,579,010 B2 | 6/2003 | Trapp | |
| 7,870,744 B2 | 1/2011 | Galivel | |
| 9,556,894 B2 | 1/2017 | Coffin | |
| 10,830,151 B2 | 11/2020 | Swift | |

OTHER PUBLICATIONS

EP Search Report for EP Patent Application No. 24206532.4 dated Apr. 7, 2025.

* cited by examiner

*Primary Examiner* — James Pilkington
(74) *Attorney, Agent, or Firm* — Getz Balich LLC

(57) ABSTRACT

A shaft bearing retainer assembly is provided that includes an axially extending shaft, a bearing, and a bearing retainer subassembly. The shaft has first and second radial surfaces, a distal end, a bearing seat, and a retainer cavity. The bearing seat is engaged with the first radial surface and extends axially inward from the distal end. The retainer cavity is disposed in the second radial surface of the shaft and extends axially inward from the distal end. The shaft includes a first threaded surface portion disposed in the retainer cavity and a second threaded surface portion in the second radial surface. The bearing has a race mounted in the bearing seat. The bearing retainer subassembly includes first and second retainer rings. The first retainer ring is in threaded engagement with the first threaded surface portion. The second retainer ring is in threaded engagement with the second threaded surface portion.

20 Claims, 19 Drawing Sheets

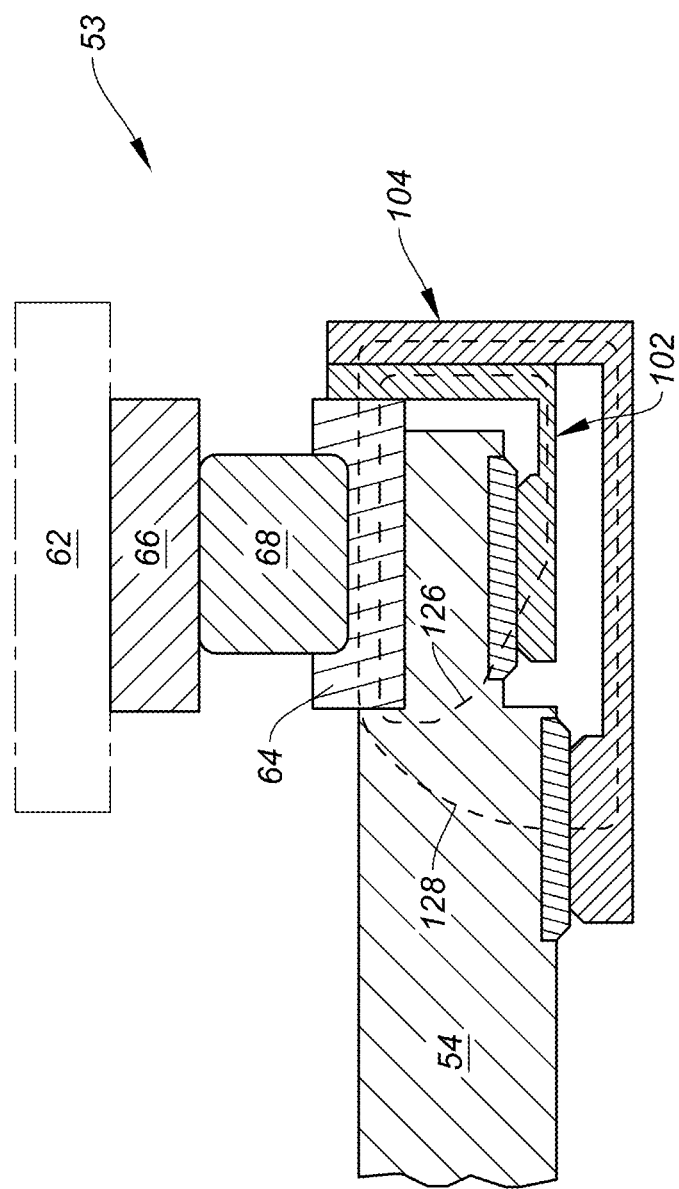

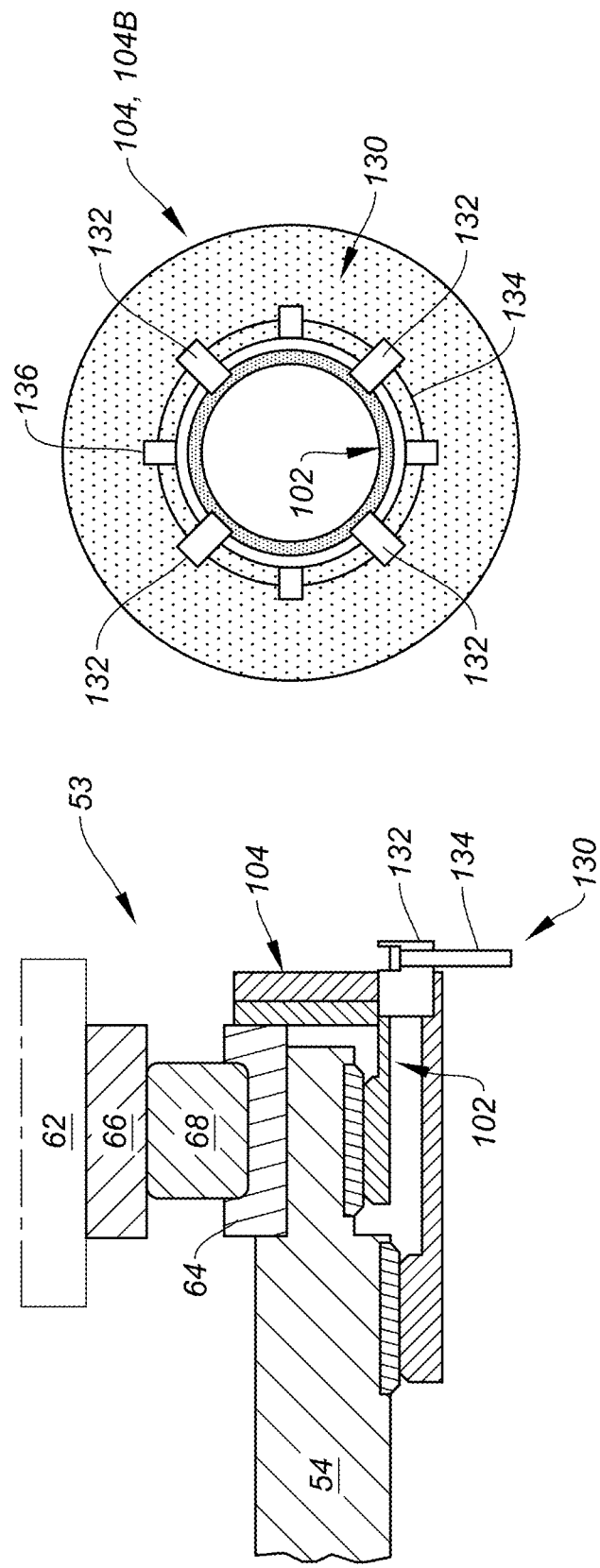

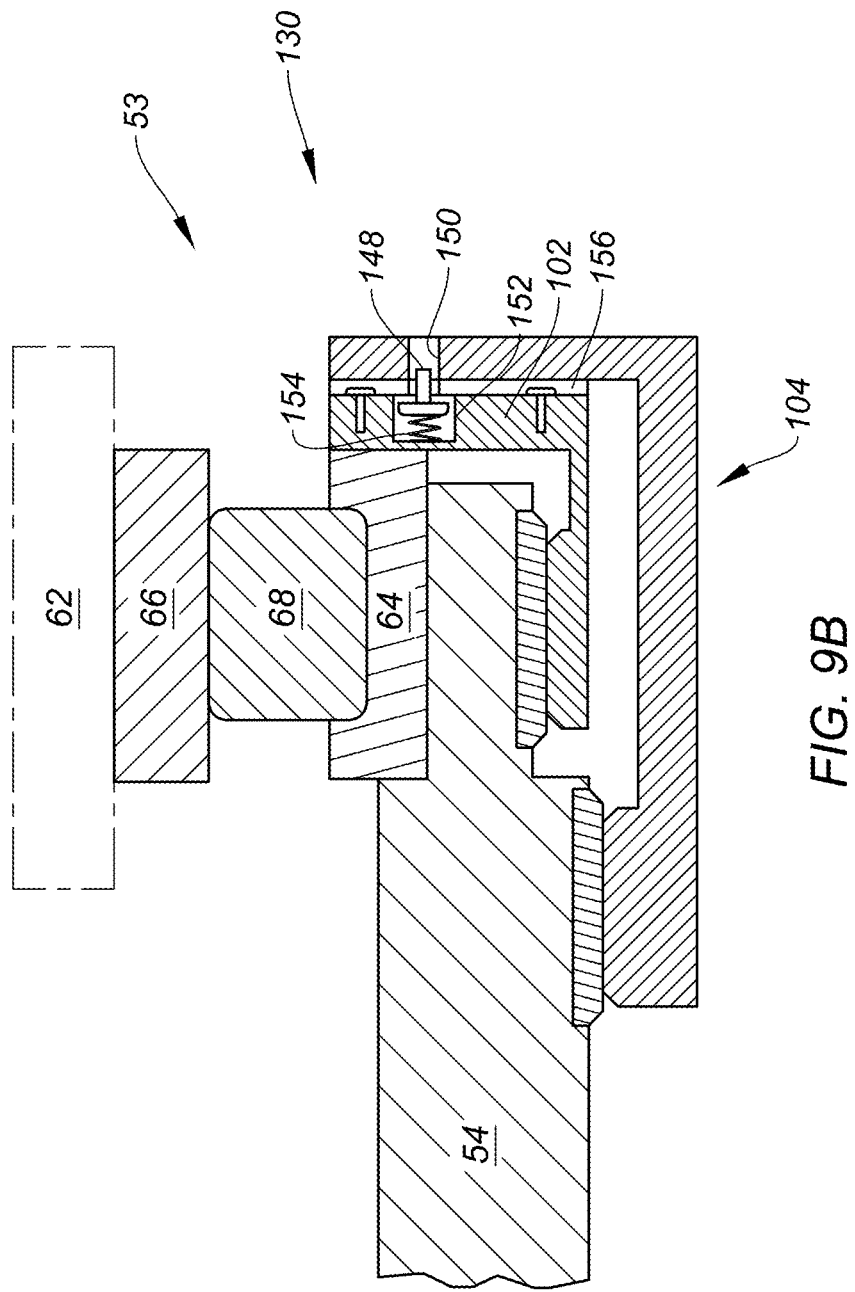

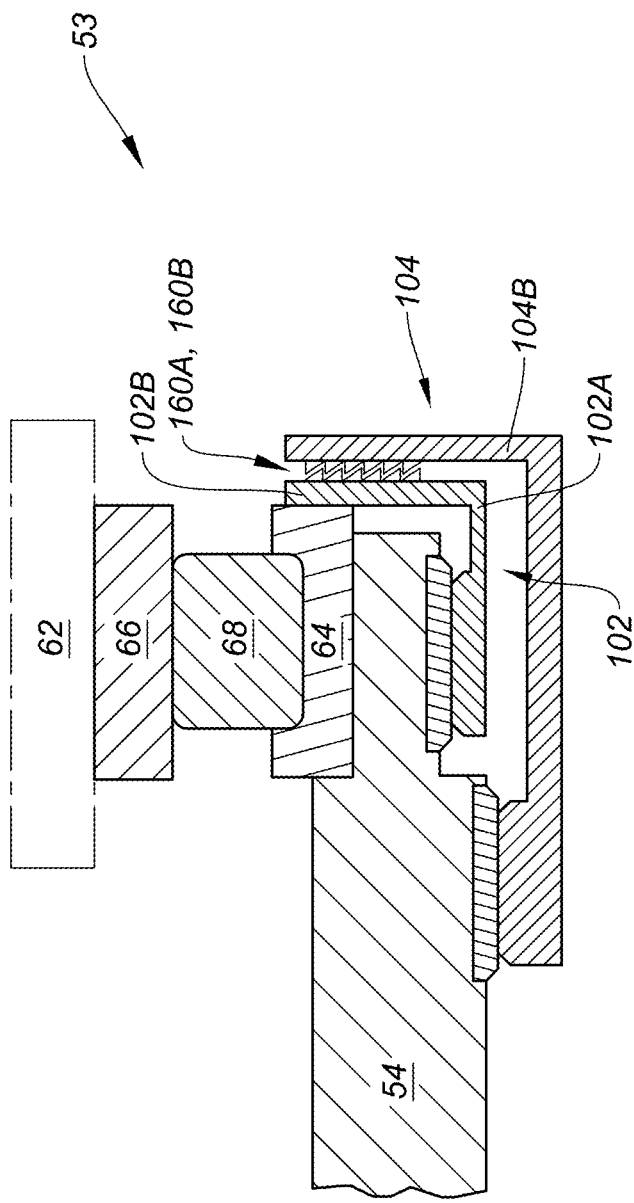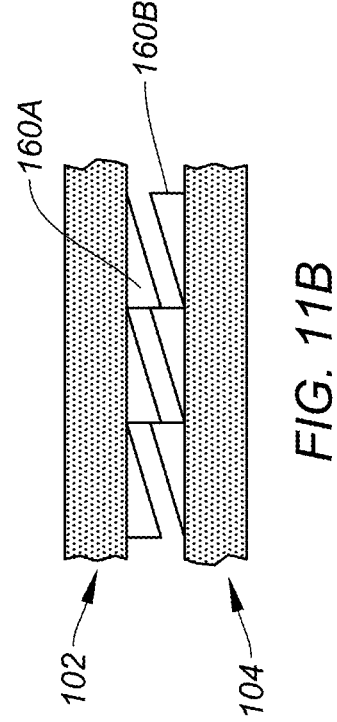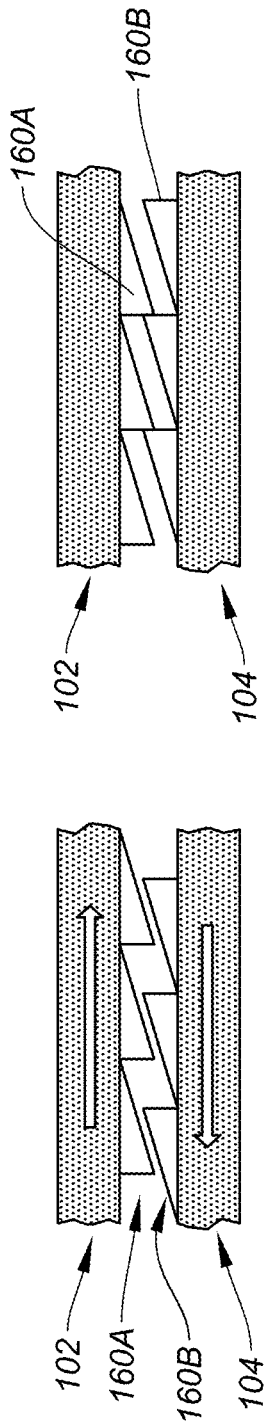

SHAFT BEARING RETAINER ASSEMBLY

BACKGROUND OF THE INVENTION

1. Technical Field

The present disclosure relates to rotating shafts in general and to apparatus for securing bearings relative to a rotating shaft in particular.

2. Background Information

Turbomachines, such as gas turbine engines, typically include fan, compressor, combustor, and turbine sections. The fan section drives air along a core flow path into the compressor section. The compressed air is mixed with fuel and combusted in the combustor section. The products of combustion are expanded in the turbine section.

A typical turbine engine has two or three shafts (sometimes referred to as "spools") that transmit torque between the turbine and compressor sections of the engine. Each of these shafts is typically supported by bearings. In some applications, a shaft bearing may be configured to accommodate both axial and radial loads. In other applications, a shaft bearing may be configured to accommodate only an axial load. Turbine engines also often include a gearbox (e.g., and accessory gearbox) driven off of one of the engine shafts. An accessory gearbox may be used to drive an electric generator, a hydraulic pump, an oil pump, or any combination thereof.

For various reasons, including but not limited to vibration and loading, shaft bearings may undesirably "walk" from their original location. It is desirable to have a structure that prevents bearing movement, and in particular a structure that is easily manufactured and implemented, and one that is cost effective.

SUMMARY

According to an aspect of the present disclosure a shaft bearing retainer assembly is provided that includes an axially extending shaft, a bearing, and a bearing retainer subassembly. The shaft has a first radial surface, a second radial surface, a distal end, a bearing seat, and a retainer cavity. The first radial surface is opposite the second radial surface. The bearing seat is engaged with the first radial surface and extends axially inward from the distal end. The retainer cavity is disposed in the second radial surface of the shaft and extends axially inward from the distal end. The shaft includes a first threaded surface portion disposed in the retainer cavity and a second threaded surface portion in the second radial surface. The bearing has a race and a plurality of roller elements. The bearing race is mounted in the bearing seat. The bearing retainer subassembly includes a first retainer ring and a second retainer ring. The first retainer ring is in threaded engagement with the first threaded surface portion and engaged with the bearing race. The second retainer ring is in threaded engagement with the second threaded surface portion and engaged with the first retainer ring.

In any of the aspects or embodiments described above and herein, the threaded engagement between the first retainer ring and the first threaded surface portion is a first threaded engagement, and the threaded engagement between the second retainer ring and the second threaded surface portion is a second threaded engagement, and the first threaded engagement may be different than the second threaded engagement.

In any of the aspects or embodiments described above and herein, the first threaded engagement has a first threads per inch value, and the second threaded engagement has a second threads per inch value, and the first threads per inch value may be different than the second threads per inch value.

In any of the aspects or embodiments described above and herein, the first threaded engagement may have a left-handed thread and the second threaded engagement may have a right-handed thread, or the first threaded engagement may have a right-handed thread and the second threaded engagement may have a left-handed thread.

In any of the aspects or embodiments described above and herein, the first retainer ring (FRR) may have a FRR axial member, a FRR radial member, and a FRR threaded collar, and the FRR threaded collar may be disposed adjacent a first axial end of the FRR axial member and the FRR radial member may extend radially out from the FRR axial member at a second axial end of the FRR axial member, and the FRR threaded collar may be in threaded engagement with the first threaded surface portion.

In any of the aspects or embodiments described above and herein, the second retainer ring (SRR) may have a SRR axial member, a SRR radial member, and a SRR threaded collar, and the SRR threaded collar may be disposed adjacent a first axial end of the SRR axial member and the SRR radial member may extend radially out from the SRR axial member at a second axial end of the SRR axial member, and the SRR threaded collar may be in threaded engagement with the second threaded surface portion.

In any of the aspects or embodiments described above and herein, the bearing seat (BS) may include an axially extending bearing mount surface and a BS shoulder surface, and the axially extending bearing mount surface may extend from the distal end to the BS shoulder surface and the BS shoulder surface may extend between the bearing mount surface and the shaft outer radial surface.

In any of the aspects or embodiments described above and herein, the bearing seat (BS) may be defined by a shoulder protrusion extending outwardly from the first radial surface and a portion of the radial surface extending between the shoulder protrusion and the shaft distal end.

In any of the aspects or embodiments described above and herein, the retainer cavity (RC) may include an RC inner diameter surface and an RC shoulder surface, and the RC inner diameter surface may extend from the distal end to the RC shoulder surface and the RC shoulder surface may extend between the RC inner diameter surface and the shaft inner radial surface.

In any of the aspects or embodiments described above and herein, the shaft bearing retainer assembly may include a locking mechanism configured to inhibit relative rotation between the first retainer ring and the second retainer ring.

In any of the aspects or embodiments described above and herein, the locking mechanism may include at least one locking key engaged with the first retainer ring and the second retainer ring.

In any of the aspects or embodiments described above and herein, the locking mechanism may include at least one lock post extending out from the first retainer ring and a slotted aperture disposed in the second retainer ring, and the lock post may include a stem and a head, and the slotted aperture may include a receiver portion and a slot portion, and the slotted aperture may include a stem locking feature.

In any of the aspects or embodiments described above and herein, the locking mechanism may include at least one mechanical fastener engaged with the first retainer ring and the second retainer ring.

In any of the aspects or embodiments described above and herein, the locking mechanism may include at least one biased detent member engaged between the first retainer ring and the second retainer ring.

In any of the aspects or embodiments described above and herein, the locking mechanism may include a deformable feature attached to one of the first retainer ring or the second retainer ring, the deformable feature configured to engage with the other of the first retainer ring or the second retainer ring to inhibit relative rotation between the first retainer ring and the second retainer ring.

In any of the aspects or embodiments described above and herein, the shaft first radial surface may be an outer radial surface of the shaft, and the shaft second radial surface may be an inner radial surface of the shaft, or the shaft first radial surface may be an inner radial surface of the shaft, and the shaft second radial surface may be an outer radial surface of the shaft.

According to an aspect of the present disclosure, a bearing assembly for a rotating shaft is provided. The shaft having a first radial surface, a second radial surface, and a distal end. The first radial surface is opposite the second radial surface. The second radial surface has a first SRR portion disposed at a first diameter and a second SSR portion disposed at a second diameter. The first diameter is different than the second diameter. The bearing assembly includes a first threaded surface portion, a second threaded surface portion, a bearing, and a bearing retainer assembly. The first threaded surface portion is disposed on the first SRR portion of the second radial surface. The second threaded surface portion is disposed on the second SRR portion of the second radial surface. The bearing has a race and a plurality of roller elements. The bearing race is mounted on the first radial surface. The bearing retainer assembly includes a first retainer ring and a second retainer ring. The first retainer ring is in threaded engagement with the first SRR portion and engaged with the bearing race. The second retainer ring is in threaded engagement with the second SRR portion and engaged with the first retainer ring. The threaded engagement between the first retainer ring and the first threaded surface portion is a first threaded engagement, and the threaded engagement between the second retainer ring and the second threaded surface portion is a second threaded engagement. The first threaded engagement is different than the second threaded engagement.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 5 is a diagrammatic view of a bearing mounted on a shaft with a present disclosure bearing shaft retainer assembly embodiment, including a locking mechanism embodiment. FIG. 5A is an end view showing a portion of the shaft bearing retainer assembly and locking mechanism shown in FIG. 5.

FIG. 11 is a diagrammatic view of a bearing mounted on a shaft with a present disclosure shaft bearing retainer assembly embodiment, including a locking mechanism embodiment. FIGS. 11A and 11B diagrammatically illustrate the locking mechanism embodiment shown in FIG. 11.

DETAILED DESCRIPTION

Figure 1:
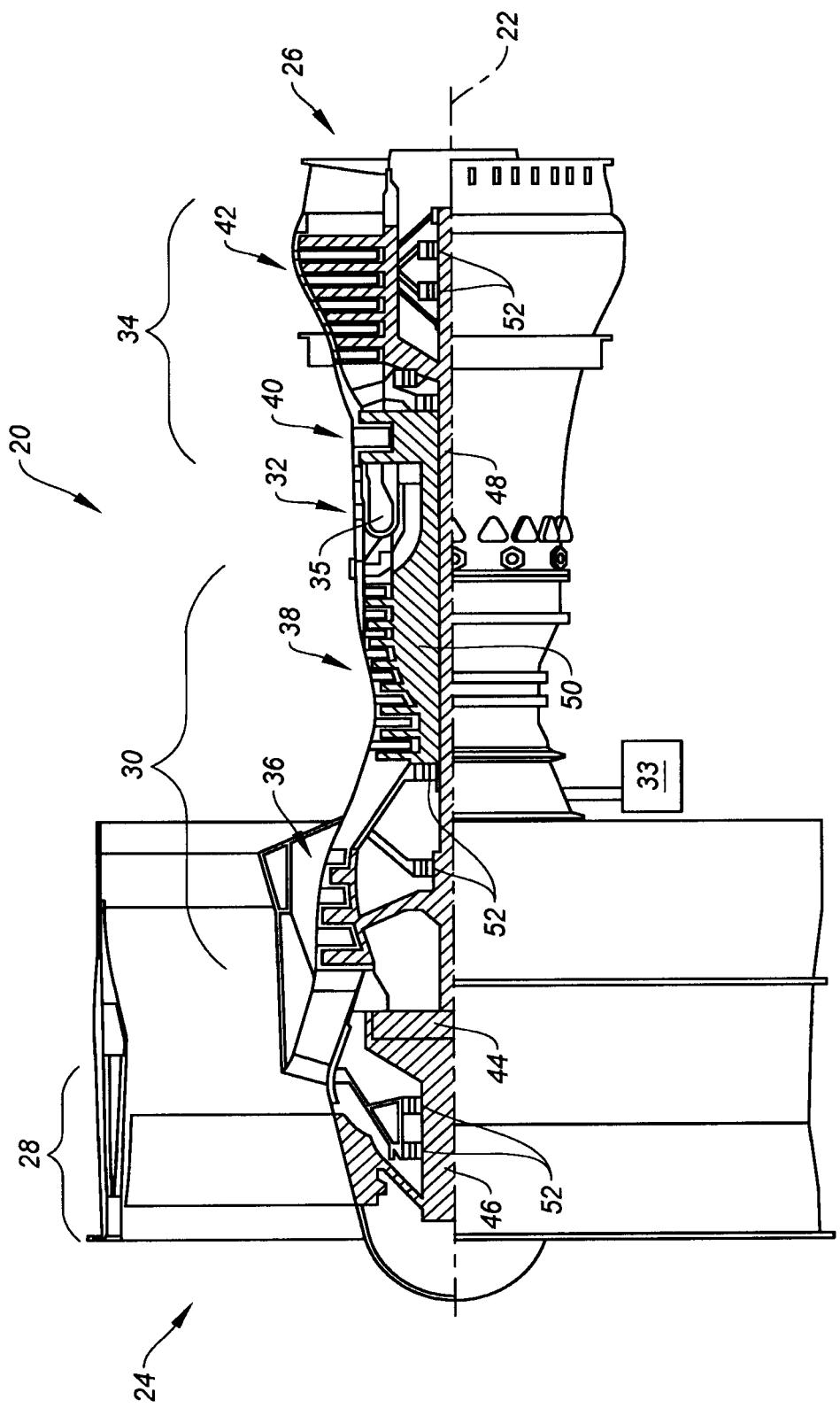
FIG. 1 is a diagrammatic sectional view of a gas turbine engine.

FIG. 1 shows a partially sectioned diagrammatic view of a geared gas turbine engine 20. The gas turbine engine 20 extends along an axial centerline 22 between an upstream air flow inlet 24 and a downstream air flow exhaust 26. The gas turbine engine 20 includes a fan section 28, a compressor section 30, a combustor section 32, a turbine section 34, and an accessory gearbox 33. The combustor section 32 includes a combustor 35. The compressor section 30 includes a low pressure compressor (LPC) 36 and a high pressure compressor (HPC) 38. The turbine section 34 includes a high pressure turbine (HPT) 40 and a low pressure turbine (LPT) 42. The engine sections are arranged sequentially along the centerline 22. The fan section 28 is connected to a geared architecture 44, for example, through a fan shaft 46. The geared architecture 44 and the LPC 36 are connected to and driven by the LPT 42 through a low speed shaft 48. The HPC 38 is connected to and driven by the HPT 40 through a high speed shaft 50. The accessory gearbox 33 may be driven off of the low speed shaft 48 or the high speed shaft 50; e.g., by a tower shaft. Accessory gearboxes often include internal shafts. The accessory gearbox 33 may be used to drive peripheral equipment such as an electric generator, a hydraulic pump, an oil pump, and the like or combinations thereof. The present disclosure is not limited to any particular accessory gearbox configuration. The aforesaid shafts 46, 48, 50 are supported by bearings 52. The terms "forward", "leading", "aft, "trailing" are used herein to indicate the relative position of a component or surface. As core gas air passes through the engine 20, a "leading edge" of a stator vane or rotor blade encounters core gas air before the "trailing edge" of the same. In a conventional axial engine such as that shown in FIG. 1, the fan section 28 is "forward" of the compressor section 30 and the turbine section 34 is "aft" of the compressor section 30. The terms "inner radial" and "outer radial" refer to relative radial positions from the engine centerline 22. An inner radial component or path is disposed radially closer to the engine centerline 22 than an outer radial component or path. The gas turbine engine 20 diagrammatically shown is an example provided to facilitate the description herein. The present disclosure is not limited to any particular gas turbine engine configuration. The various embodiments of the present disclosure shaft bearing assembly described herein may be used in a variety of different applications; e.g., within a turbine engine, within a gearbox, and the like. The present disclosure shaft bearing retainer assembly has particular utility in applications having limited space adjacent the distal end of a shaft to secure a bearing engaged with the shaft. Accessory gearboxes used with aircraft turbine engines are a specific example of an application that very often has limited space adjacent the distal end of a shaft. Consequently, the present disclosure is understood to have particular utility in accessory gearbox applications.

Figure 2:
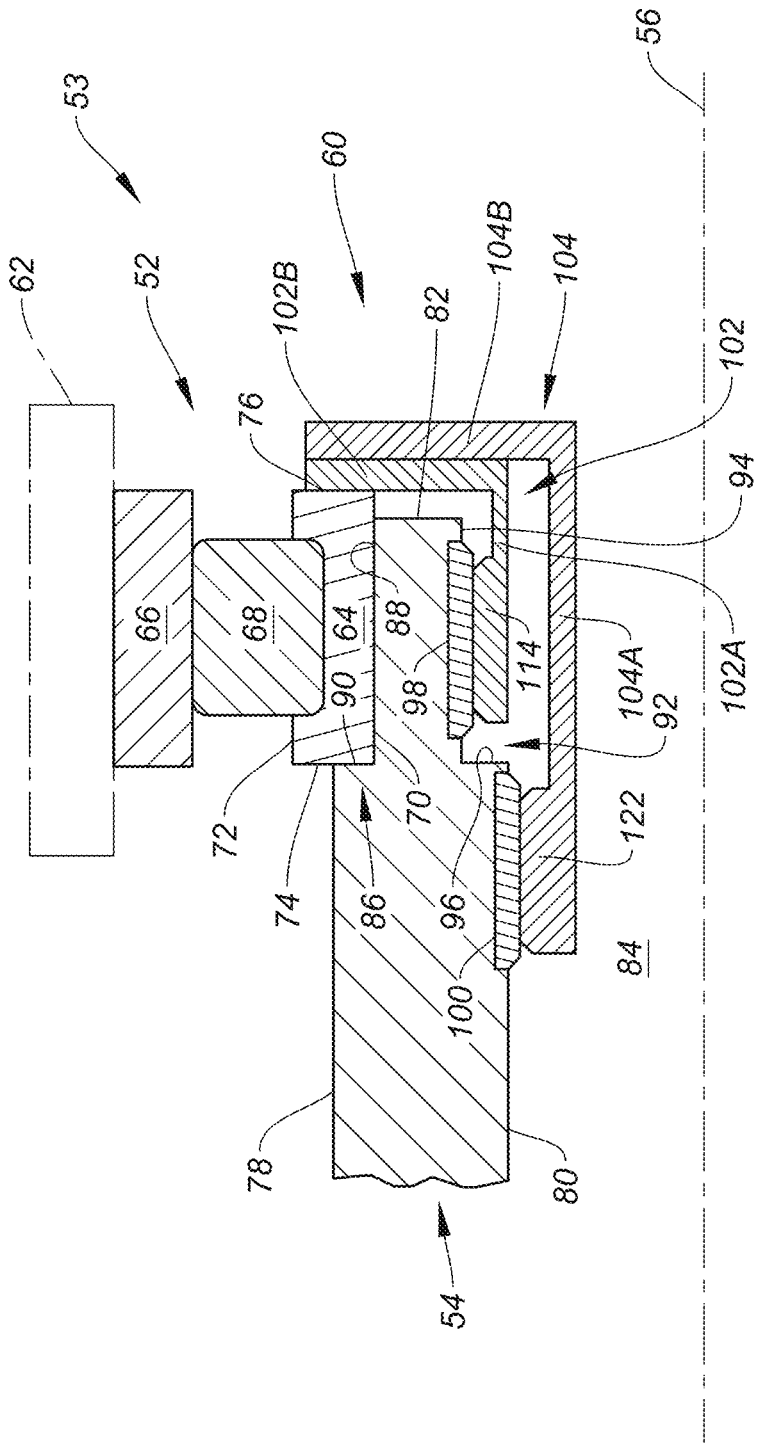
FIG. 2 is a diagrammatic view of a bearing mounted on a shaft with a present disclosure shaft bearing retainer assembly embodiment.
Figure 2A:
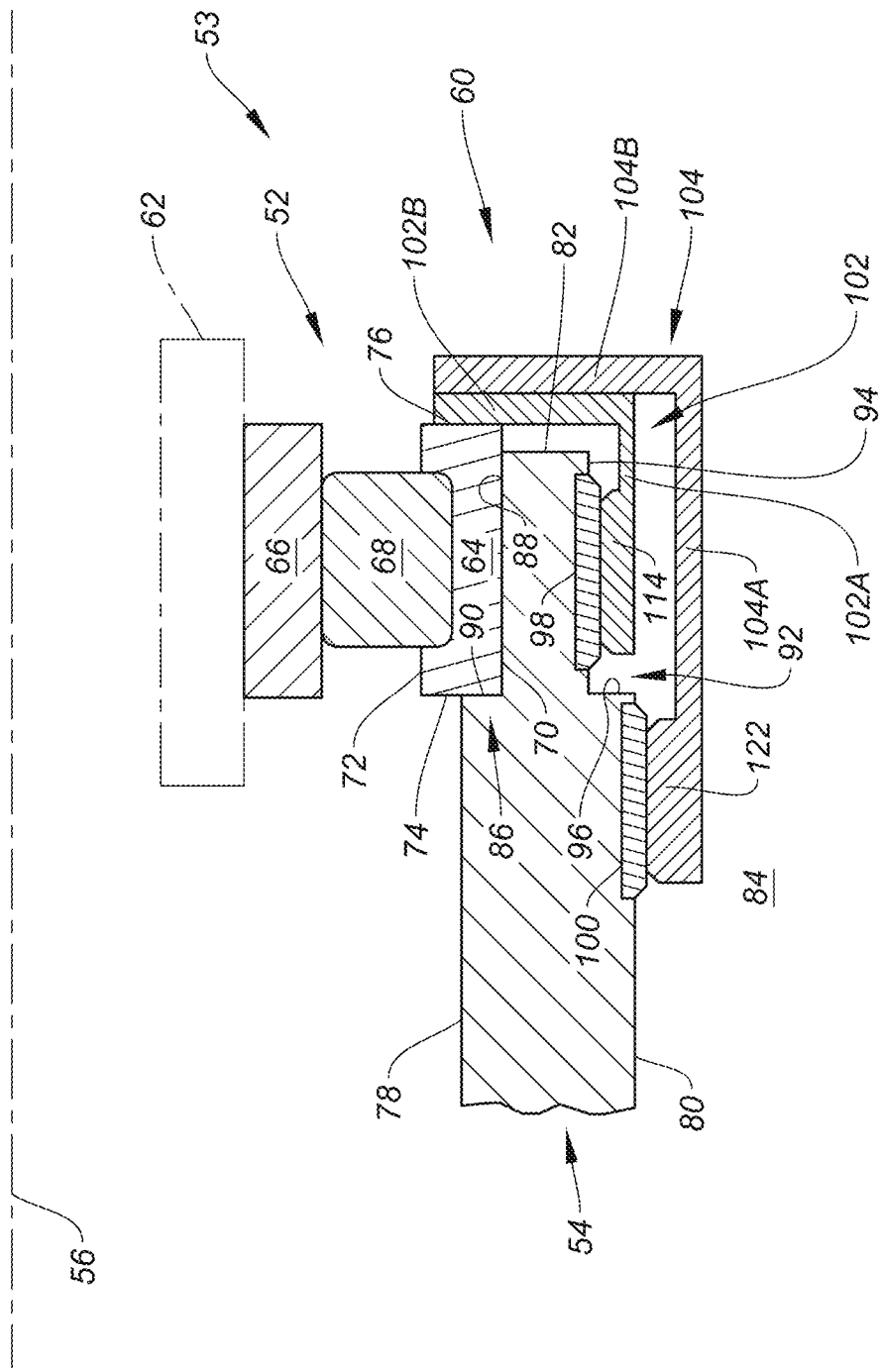
FIG. 2A is a diagrammatic view of a bearing mounted on a shaft with a present disclosure shaft bearing retainer assembly embodiment.

FIGS. 2 and 2A diagrammatically illustrate an embodiment of a present disclosure shaft bearing retainer assembly 53 that includes a shaft 54 rotatable about an axial centerline 56, a bearing 52, and a bearing retainer subassembly 60. The present disclosure shaft bearing retainer assembly 53 may include a structural component 62, or may be utilized with a structural component 62. The term "shaft 54" as used herein refers to a shaft that may be present within a turbine engine 20, or a gearbox (e.g., an accessory gearbox 33), or the like, and is not limited to any particular shaft application. FIG. 2 illustrates the bearing 52 disposed radially outside of the shaft 54. Alternatively, the bearing 52 may be disposed radially inside of the shaft 54 as shown in FIG. 2A. To facilitate the description herein, the present disclosure is detailed herein in terms of a bearing 52 disposed radially outside of the shaft 54 and other components relative to a outer radial bearing 52. The present disclosure is not, however, limited to an outer bearing 52 construct. The bearing 52 includes an inner race 64, an outer race 66, and a plurality of roller elements 68 disposed between the inner and outer races 64, 66. The present disclosure is not limited to any particular bearing 52 configuration other than one having inner and outer races 64, 66 and roller elements 68. For example, the roller elements 68 are shown as cylindrical but the present disclosure is not limited to any particular roller element 68 configuration; e.g., the roller elements 68 may be spherical tapered roller elements, and the like. The bearing 52 may be configured to accommodate axial loads, or radial loads, or any combination thereof. The bearing inner race 64 includes an inner diameter surface 70, a roller element surface 72, a first lateral surface 74, and a second lateral surface 76. The first and second lateral surfaces 74, 76 are opposite one another and extend between the inner diameter surface 70 and the roller element surface 72.

The structural component 62 shown (in dashed lines) radially outside of the bearing 52 may be a static structure (e.g., stationary relative to the shaft 54) or a rotational structure (e.g., capable of rotation relative to the shaft 54). In those embodiments wherein the present disclosure includes a bearing 52 disposed radially inside of the shaft 54 (e.g., see FIG. 2A), the structural component is disposed radially inside of the bearing 52. The structural component 62 is engaged with the bearing outer race 66. The present disclosure is not limited to any particular structural component 62 disposed radially outside of the bearing 52.

Figure 2B:
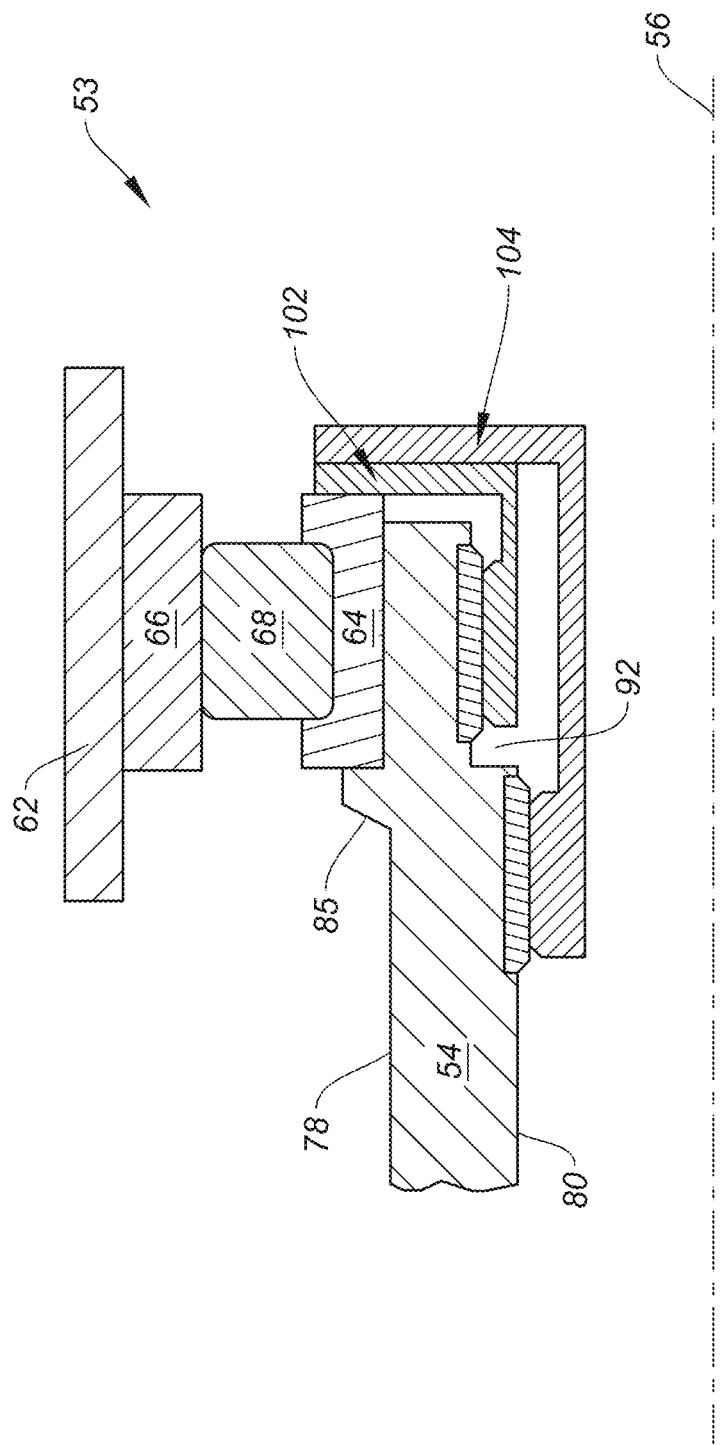
FIG. 2B is a diagrammatic view of a bearing mounted on a shaft with a present disclosure shaft bearing retainer assembly embodiment.

The shaft 54 has an annular configuration that extends axially. The shaft 54 includes a first radial surface 78, a second radial surface 80, a distal end 82, and an inner cavity 84. Herein, with respect to FIGS. 2 and 2B, the first radial surface 78 is embodied as an outer radial surface and the second radial surface 80 is embodied as an inner radial surface. Alternatively, in those embodiments wherein the present disclosure includes the bearing 52 disposed radially inside of the shaft 54 (e.g., see FIG. 2A), the first radial surface 78 is embodied as the inner radial surface and the second radial surface 80 is embodied as the outer radial surface. The second radial surface 80 defines the shaft inner cavity 84. In the embodiments shown in FIGS. 2 and 4-11, the shaft 54 further includes a bearing seat 86 disposed in the outer radial surface 78 of the shaft 54, extending axially inward from the distal end 82 of the shaft 54. The bearing seat 86 is defined by an axially extending bearing mount surface 88, and a shoulder surface 90 extending radially between the bearing mount surface 88 and the shaft outer radial surface 78. FIG. 2B diagrammatically illustrates a shoulder protrusion 85 extending out from the outer radial surface of the shaft 54. The shoulder protrusion 85 and the portion of the shaft outer radial surface 78 extending between the distal end 82 and the shoulder protrusion 85 is an alternative bearing seat 86 for positioning the bearing inner race 64. The shaft 54 further includes a retainer cavity 92 disposed in the inner radial surface 80 of the shaft 54, extending axially inward from the distal end 82 of the shaft 54. The retainer cavity 92 (RC) is defined by an axially extending RC inner diameter surface 94, and an RC shoulder surface 96 extending radially between the RC inner diameter surface 94 and the shaft inner radial surface 80 (see FIG. 2). All or a portion of the RC inner diameter surface 94 may be threaded. The threaded portion 98 of the RC inner diameter surface 94 is configured (e.g., type of thread, threads per inch (TPI), and the like) for threaded engagement with a first retainer ring 102 as detailed herein. A portion of the shaft inner radial surface 80 may be threaded. In the embodiment diagrammatically shown in FIG. 2, the threaded portion 100 of the shaft inner radial surface 80 is disposed adjacent the RC shoulder surface 96. The threaded portion 100 of the shaft inner radial surface 80 is configured (e.g., type of thread, threads per inch (TPI), and the like) for engagement with a threaded portion of the second retainer ring 104 as will be detailed herein.

Figure 3:
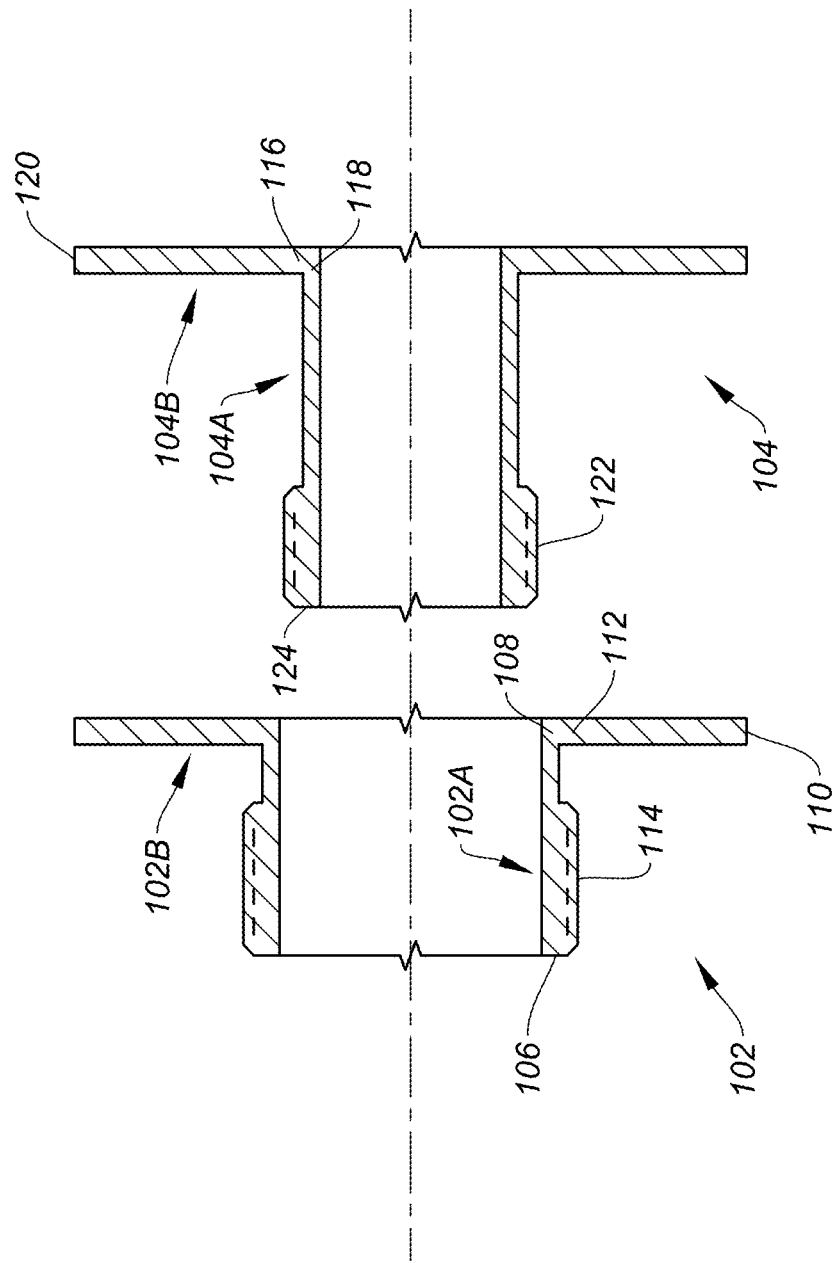
FIG. 3 is a diagrammatic representation of a first retainer ring embodiment and a second retainer ring embodiment.

Referring to FIGS. 2 and 3, the bearing retainer subassembly 60 includes a first retainer ring 102 and a second retainer ring 104. The first retainer ring 102 includes an axial member 102A and a radial member 102B. The axial member 102A extends axially between a first axial end 106 and a second axial end 108. The radial member 102B extends radially between an outer radial end 110 and an inner radial end 112. The radial member 102B is connected to or integral with the axial member 102A. To facilitate the description herein, the radial member 102B and the axial member 102A will be described as connected, but the present disclosure is not limited to any particular connection configuration; e.g., integrally connected, mechanically connected, and the like. In the embodiment shown in FIGS. 2 and 3, the inner radial end 112 of the radial member 102B extends outwardly from the second axial end 108 of the axial member 102A. The present disclosure is not limited to this particular axial member 102A/radial member 102B configuration; e.g., as detailed herein the present disclosure contemplates various axial member 102A/radial member 102B configurations. In the embodiment shown in FIGS. 2 and 3, the radial member 102B is substantially perpendicular to the axial member 102A but the present disclosure is not limited to a radial member 102B that is perpendicular to the axial member 102A. As will be detailed herein, the first retainer ring radial member 102B is configured to engage with the second lateral surface 76 of the bearing inner race 64.

The first retainer ring 102 includes a threaded collar 114 disposed at or adjacent to the first axial end 106 of the axial member 102A. The threaded collar 114 includes a threaded surface configured (e.g., type of thread, threads per inch (TPI), and the like) for engagement with a threaded portion of the shaft 54; e.g., engagement with the threaded portion 98 of the RC inner diameter surface 94.

In the embodiment shown in FIGS. 2 and 3, the first and second retainer rings 102, 104 are similarly configured; i.e., the second retainer ring 104 includes an axial member 104A and a radial member 104B, and the radial member 104B is connected to the axial member 104A. In the second retainer ring 104 embodiment shown in FIGS. 2 and 3, the inner radial end 116 of the radial member 104B is connected to the second axial end 118 of the axial member 104A, and the radial member 104B extends radially outward from the axial member 104A to its outer radial end 120. Like the first retainer ring 102, the second retainer ring 104 has a radial member 104B that is substantially perpendicular to the axial member 102A. The second retainer ring 104 includes a threaded collar 122 disposed at or adjacent to the first axial end 124 of the axial member 104A. The threaded collar 122 includes a threaded surface configured (e.g., type of thread, threads per inch (TPI), and the like) for engagement with a threaded portion of the shaft 54; e.g., engagement with the threaded portion 100 of the shaft inner radial surface 80.

Figure 4:
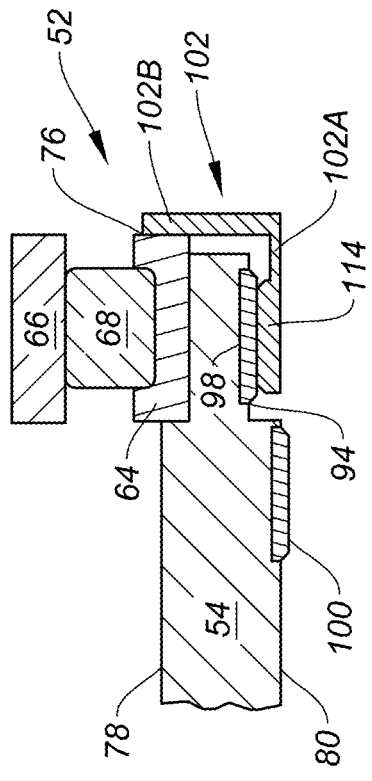
FIGS. 4-4B diagrammatically illustrate an example of an assembly sequence of a present disclosure shaft bearing retainer assembly.

Referring to FIGS. 4-4C, the following non-limiting example of how a present disclosure bearing 52 and bearing retainer subassembly 60 may be assembled onto a shaft 54 illustrates advantages provided by the present disclosure. FIG. 4 illustrates a bearing 52 mounted on the bearing mount surface 88 of the shaft 54. Typically, the bearing inner race 64 is press fit onto the bearing mount surface 88 and the first lateral surface 74 of the bearing inner race 64 is engaged with the bearing seat shoulder surface 90. As can be seen in FIG. 4, the shaft 54 includes a retainer cavity 92, a threaded portion 98 of the RC inner diameter surface 94, and a threaded portion 100 of the shaft inner radial surface 80.

Figure 4A:
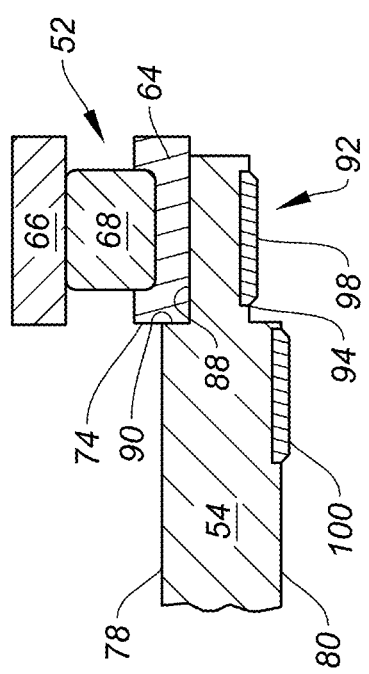
FIG. 4C diagrammatically illustrates torque loadings associated with embodiments of the present disclosure shaft bearing retainer assembly.

FIG. 4A illustrates the same shaft 54 and bearing 52 arrangement as shown in FIG. 4 and now also diagrammatically includes a first retainer ring 102. The first retainer ring 102 is torqued onto the shaft 54 via the threaded engagement between the threaded portion 98 of the RC inner diameter surface 94 and the threaded collar 114 of the first retainer ring 102. The radial member 102B of the first retainer ring 102 is engaged with the second lateral surface 76 of the bearing inner race 64. When the first retainer ring 102 is torqued onto the shaft 54 in this manner, the portion of the shaft 54 disposed radially inside of the bearing 52 is under tension and the first retainer ring 102 radial member 102B applies a retaining force (e.g., a biasing force) against the bearing inner race 64. Dashed line 126 shown in FIG. 4C is intended to symbolize the loading created by torquing the first retainer onto the shaft 54.

Figure 4B:
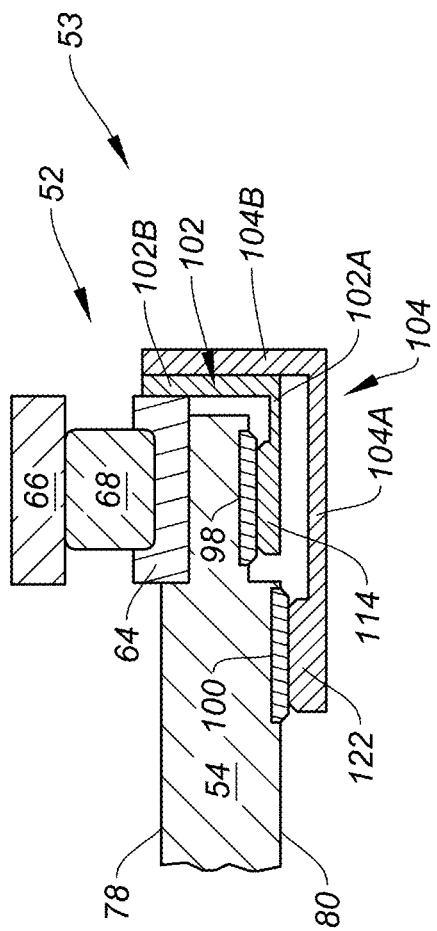

FIG. 4B illustrates the same shaft 54 and bearing 52 arrangement shown in FIGS. 4 and 4A and now also includes a second retainer ring 104. The second retainer ring 104 is torqued onto the shaft 54 via the threaded engagement between the threaded portion 100 of the shaft inner radial surface 80 and the threaded collar 122 of the second retainer ring 104. The radial member 104B of the second retainer ring 104 is engaged with the radial member 102B of the first retainer ring 102. When the second retainer ring 104 is torqued onto the shaft 54 in this manner, a portion of the shaft 54 axially beyond the bearing 52 is under tension. The tension applied to the axially beyond portion of the shaft 54 is understood to counter the tension applied to the portion of the shaft 54 disposed radially inside of the bearing 52. Dashed line 128 shown in FIG. 4C is intended to symbolize the loading created by torquing the second retainer ring 104 onto the shaft 54. The second retainer ring radial member 104B applies a retaining force (e.g., a biasing force) against the first retainer ring radial member 102B.

As indicated above, the threaded collar 114 of the first retainer ring 102 is in threaded engagement with the threaded portion 98 of the RC inner diameter surface 94 (i.e., a first threaded engagement), and the threaded collar 122 of the second retainer ring 104 is in threaded engagement with the threaded portion 100 of the shaft inner radial surface 80 (i.e., a second threaded engagement). In some embodiments, the first and second threaded engagements may be dissimilar to decrease the potential of either the first retainer ring 102 or the second retainer ring 104 loosening; e.g., unthreading. As a non-limiting example, the first threaded engagement may be configured to have ten (10) threads per inch, and the second threaded engagement may be configured to have eight (8) threads per inch. In this non-limiting example, for every rotation the first retainer ring 102 travels axially one-eighth of an inch (0.125 inches) relative to the shaft 54. In contrast, for every rotation the second retainer ring 104 travels axially one-tenth of an inch (0.10 inches) relative to the shaft 54. Hence, the first retainer ring 102 (FRR) and the second retainer ring 104 (SRR) travel axially at different rates. The effective pitch between the two threaded engagements may be algorithmically characterized as follows:

$$\text{Effective Pitch} = 1/(1/P_{FRR} - 1/P_{SRR})$$

where "$P_{FRR}$" is the threads per inch for the first retainer ring 102 and where "$P_{SRR}$" is the threads per inch for the second retainer ring. Using the non-limiting example data:

$$\text{Effective Pitch} = 1/(1/8 - 1/10) = 40$$

The Effective Pitch is forty (40) and the "gain" (a measure of the mechanical advantage provided) is 40/10=4. Hence, using the example thread characteristics, the present disclosure yields a tensile preload that is four (4) times greater than a fastener (e.g., a lock nut) applied to the shaft 54 to secure the bearing inner race 64 that utilizes a ten (10) threads per inch configuration. Another advantage of the present disclosure is that the first and second threaded engagements can be manipulated to increase or decrease the gain to a desired level for the application at hand. In some embodiments, the first and second threaded engagements may be oppositely threaded; e.g., the first threaded engagement may be configured to a right-handed thread and the second threaded engagement may be configured to have a left-handed thread, or vice versa.

As will be detailed herein, embodiments of the present disclosure may use a locking mechanism 130 to lock the first retainer ring 102 and the second retainer ring 104 to prevent relative motion therebetween. The present disclosure contemplates that a number of different locking mechanisms 130 may be utilized.

FIGS. 5 and 5A diagrammatically illustrate a present disclosure locking mechanism 130 embodiment that includes at least one locking key 132 that is disposed to engage both the first retainer ring 102 and the second retainer ring 104. The example shown in FIGS. 5 and 5A includes four (4) locking keys 132. The locking keys 132 may be received within apertures or other openings disposed in the first and second retainer rings 102, 104. The locking keys 132 may be connected to one another with a snap ring 134 or other mechanical fastener. In some embodiments (e.g., see FIG. 5A), the second retainer ring 104 may include protrusions 136 (e.g., "snap ring seats 136") configured to support and/or position a mechanical fastener such as a snap ring 134. To utilize this locking mechanism 130 embodiment, the first and second retainer rings 102, 104 are torqued relative to the shaft 54 as described above. The apertures (or other openings) disposed in the first retainer ring 102 and the second retainer ring 104 are aligned and the locking keys 132 are inserted. As indicated, the locking keys 132 may be connected to one another with a mechanical fastener; e.g., a snap ring 134.

Figure 6:
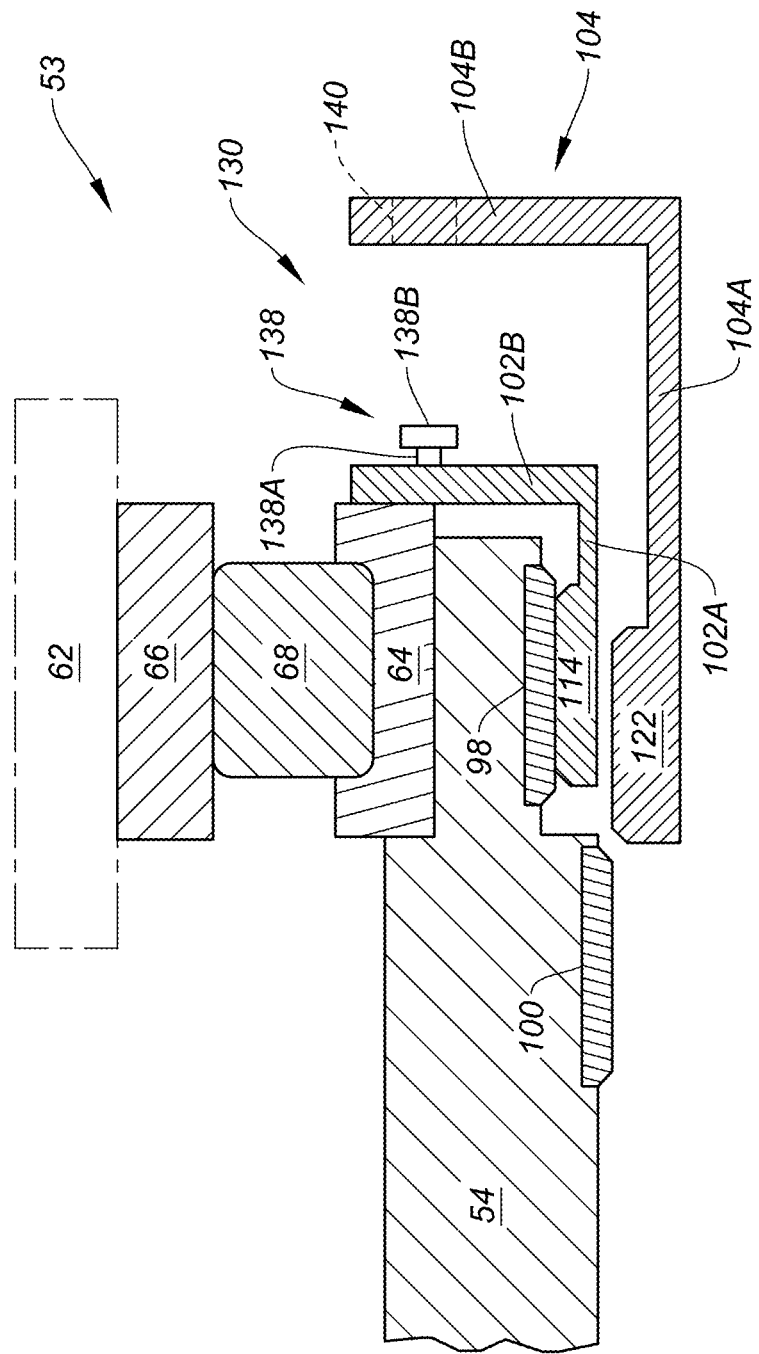
FIG. 6 is a diagrammatic view of a bearing mounted on a shaft with a present disclosure shaft bearing retainer assembly embodiment with the second retainer ring separated, and a locking mechanism embodiment.
Figure 6A:
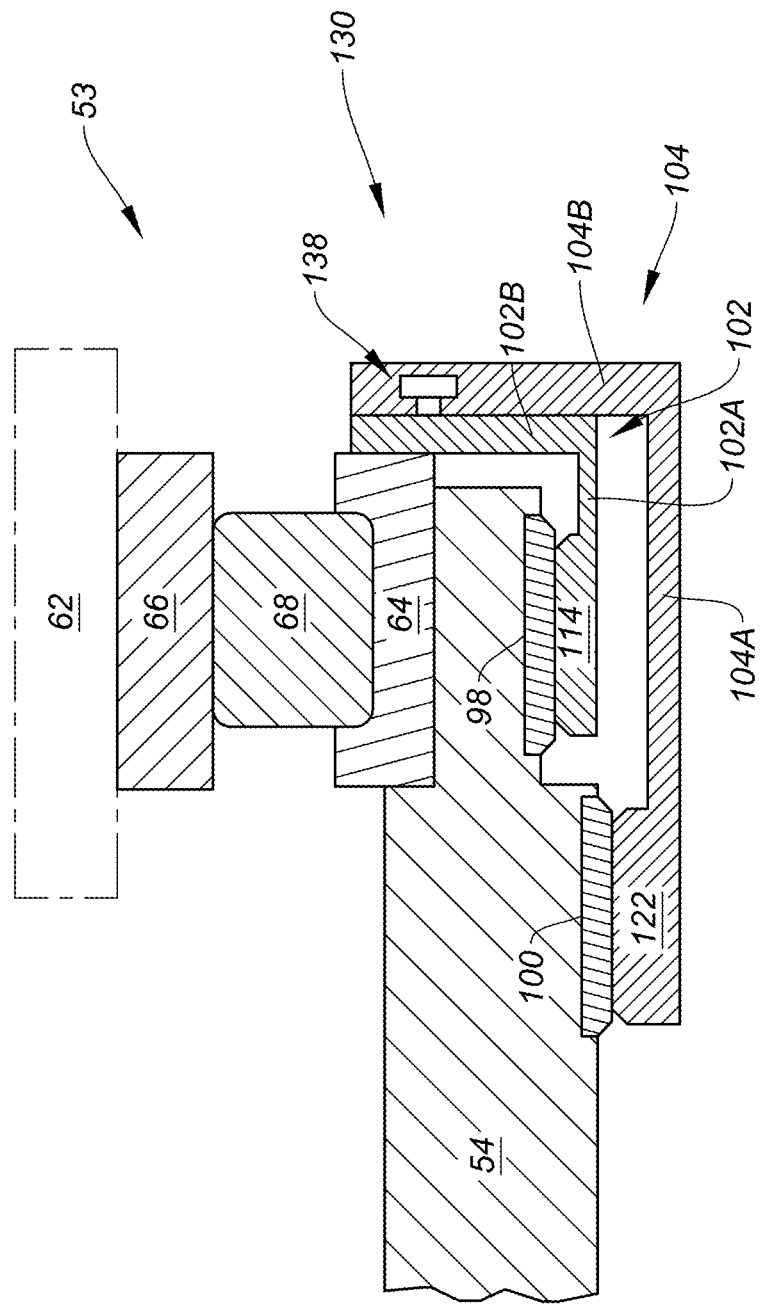
FIG. 6A illustrates the present disclosure shaft bearing retainer assembly embodiment shown in FIG. 6, now with the second retainer ring separated engaged.
Figure 6B:
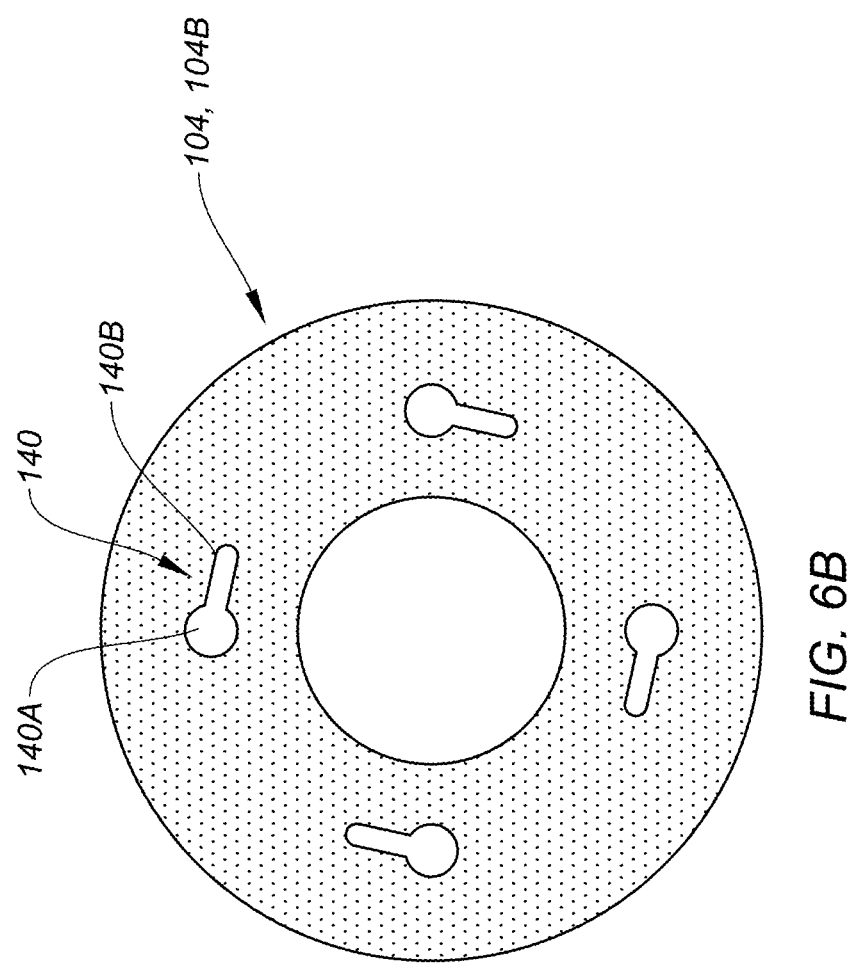
FIG. 6B is a diagrammatic view of the second retainer shown in FIGS. 6 and 6A.
Figure 6C:
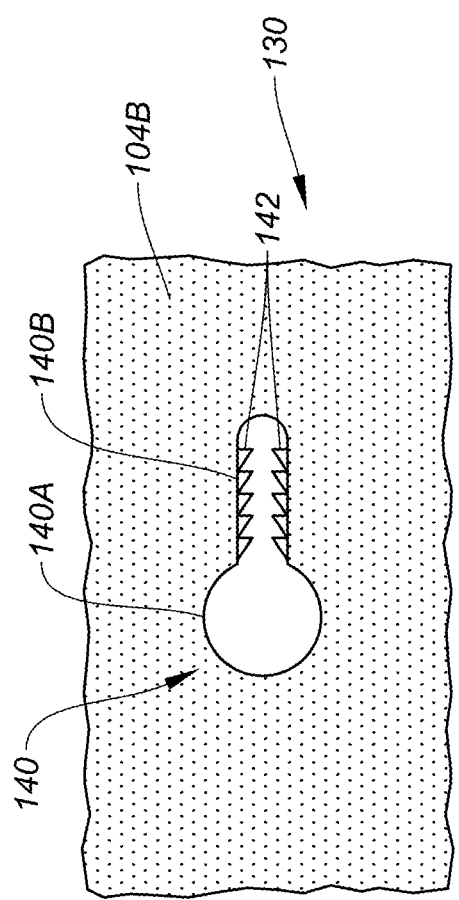
FIGS. 6C and 6D illustrates different embodiments of a slotted aperture.
Figure 6D:
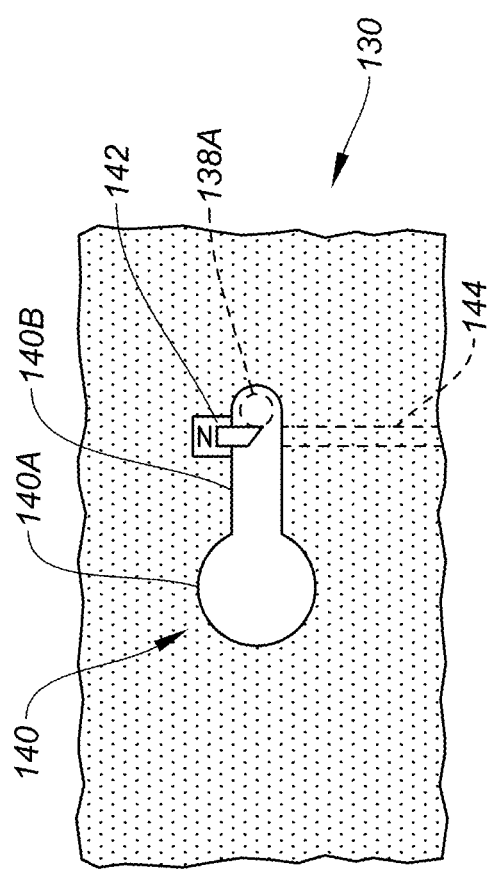

FIGS. 6-6D diagrammatically illustrate a present disclosure locking mechanism 130 embodiment that includes a first retainer ring 102 having at least one lock post 138 and a second retainer ring 104 having one or more slotted apertures 140 (see FIG. 6B). The lock post 138 embodiment shown in FIG. 6 has a stem 138A and a head 138B that is larger than the stem 138A; e.g., greater in diameter. The slotted aperture 140 includes a receiver portion 140A configured to receive a lock post 138 (lock post head 138B allowed to pass through) and a narrower slot portion 140B configured to receive a lock post stem 138A. The geometry of the slot portion 140B does not permit the lock post head 138A to pass axially through the slot portion 140B. To utilize this locking mechanism 130 embodiment, the first retainer ring 102 may be torqued relative to the shaft 54 and the second retainer ring 104 may be torqued relative to the shaft 54. As the second retainer ring 104 draws close to the first retainer ring 102, the lock posts 138 are received within the slotted apertures 140 until each respective lock post stem 138 is received within a respective slot portion 140B of a slotted aperture 140. Alternatively, the first and second retainer rings 102, 104 may be coupled with one another so that the respective lock posts 138 are received within respective receiver portions 140A of respective slotted apertures 140. The first and second retainer rings 102, 104 may then be torqued relative to the shaft 54. When the appropriate amount of torque for the first retainer ring 102 is achieved, the second retainer ring 104 is either torqued an additional amount so that the lock post stems 138 are received within the slot portions 140B of slotted aperture 140, or the second retainer ring 104 is backed off (i.e., rotated) so that the lock post stems 138 are received within the slot portions 140B of slotted apertures 140. Either way, the lock post heads 138 maintain the first and second retainer rings 102, 104 engaged with one another. FIG. 6B diagrammatically illustrates the first and second retainer rings 102, 104 engaged with one another. This present disclosure locking mechanism 130 embodiment is not limited to this assembly example.

Referring to FIGS. 6C and 6D, in some embodiments a stem locking feature 142 may be included that inhibits or prevents the stem 138A from traversing out of the slot portion 140B of the slotted aperture 140. FIG. 6C, for example, illustrates a slot portion 140B of a slotted aperture 140 having directional features (e.g., elastically deformable teeth) that allow the stem 138A to travel into the slot portion 140B but inhibit stem 138A travel out of the slot portion 140B. FIG. 6D illustrates another example wherein a slotted aperture 140 includes a biased lock mechanism 142. As the stem 138A travels within the slot portion 140B and engages the biased lock mechanism 142, the biased lock mechanism retracts, allowing the stem 138A to pass. After the stem 138A has passed, the biased lock mechanism 142 moves into the slot portion 140B behind the stem 138A, thereby preventing the stem 138A from withdrawing from the slot portion 140B. In some embodiments (e.g., as shown in FIG. 6D), the biased lock mechanism 142 may include an actuation port 144 that allows insertion of a tool to retract the biased lock mechanism 142 to permit the stem 138A to be moved out of the slotted portion 140B.

Figure 7:
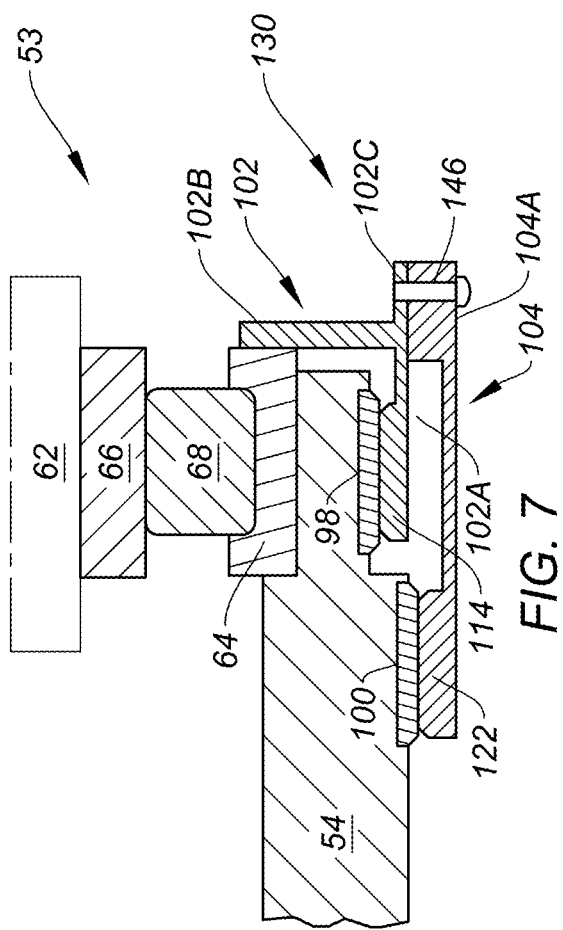
FIG. 7 is a diagrammatic view of a bearing mounted on a shaft with a present disclosure shaft bearing retainer assembly embodiment, including a locking mechanism embodiment.
Figure 7A:
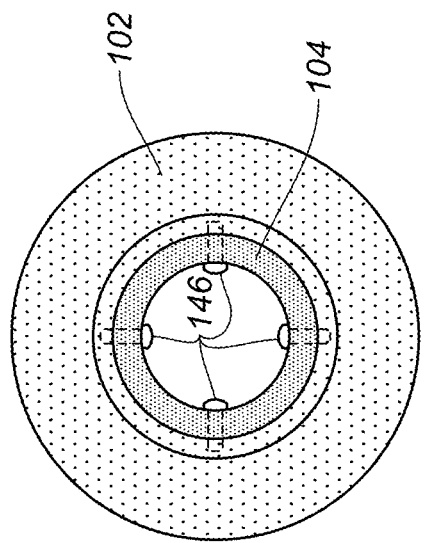
FIG. 7A is an end view showing a portion of the bearing retainer assembly and locking mechanism shown in FIG. 7.

FIGS. 7 and 7A diagrammatically illustrate a present disclosure locking mechanism 130 embodiment that includes a first and second retainer ring 104 coupled together with one of more mechanical fasteners 146. In this embodiment, the second retainer ring 104 does not include a radial member 104B configured to engage with the radial member 102A of the first retainer ring 102. In this embodiment, the first retainer ring 102 includes a flange 102C extending axially outward past the first retainer ring radial member 102B and the second retainer ring 104 is configured to align with the flange 102C. One or more mechanical fasteners 146 (e.g., rivets, screws, bolts and the like) extend through the second retainer ring 104 and into the first retainer ring flange 102C to secure the first and second retainer rings 102, 104 together. Conversely, the mechanical fasteners 146 may be installed through the first retainer ring flange 102C and extend into the second retainer ring 104 to secure the first and second retainer rings 102, 104 together. The tensile loadings symbolized by the dashed lines 126, 128 in FIG. 4C are understood to also apply to this locking mechanism 130 embodiment.

Figure 8:
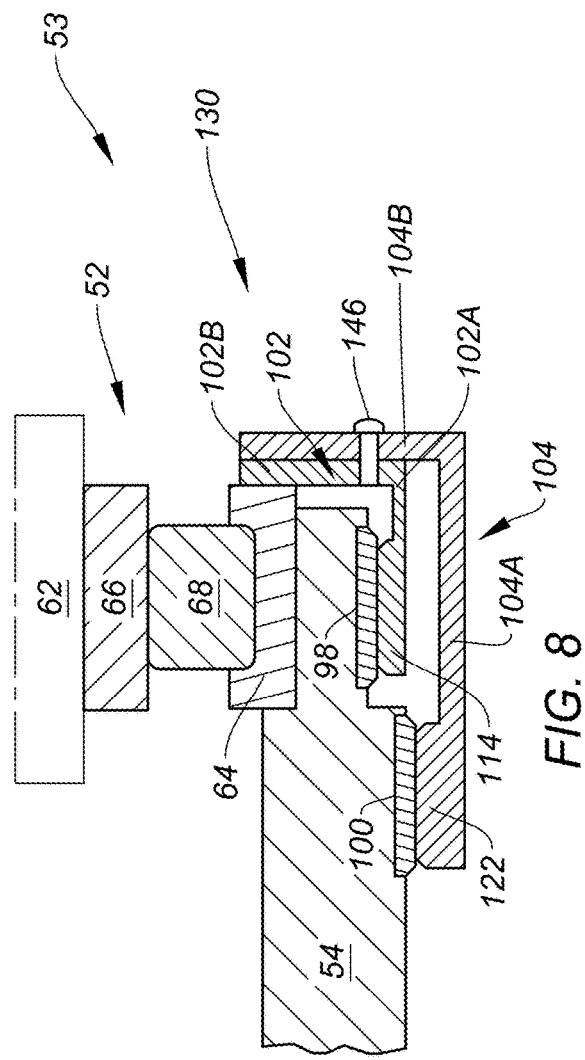
FIG. 8 is a diagrammatic view of a bearing mounted on a shaft with a present disclosure shaft bearing retainer assembly embodiment, including a locking mechanism embodiment.
Figure 8A:
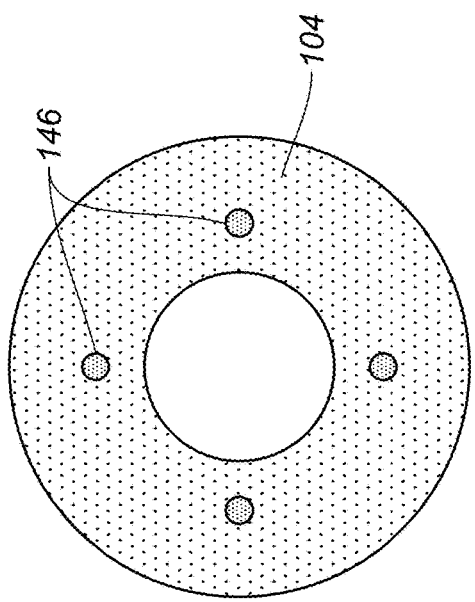
FIG. 8A is an end view showing a portion of the bearing retainer assembly and locking mechanism shown in FIG. 8.

FIGS. 8 and 8A diagrammatically illustrate another present disclosure locking mechanism 130 embodiment that utilizes one of more mechanical fasteners 146. In this embodiment, the one or more mechanical fasteners 146 (e.g., rivets, screws, bolts and the like) extend through the second retainer ring radial member 104B and into the first retainer ring radial member 102B to secure the first and second retainer rings 102, 104 together. The tensile loadings symbolized by the dashed lines 126, 128 in FIG. 4C are understood to also apply to this locking mechanism 130 embodiment.

Figure 9:
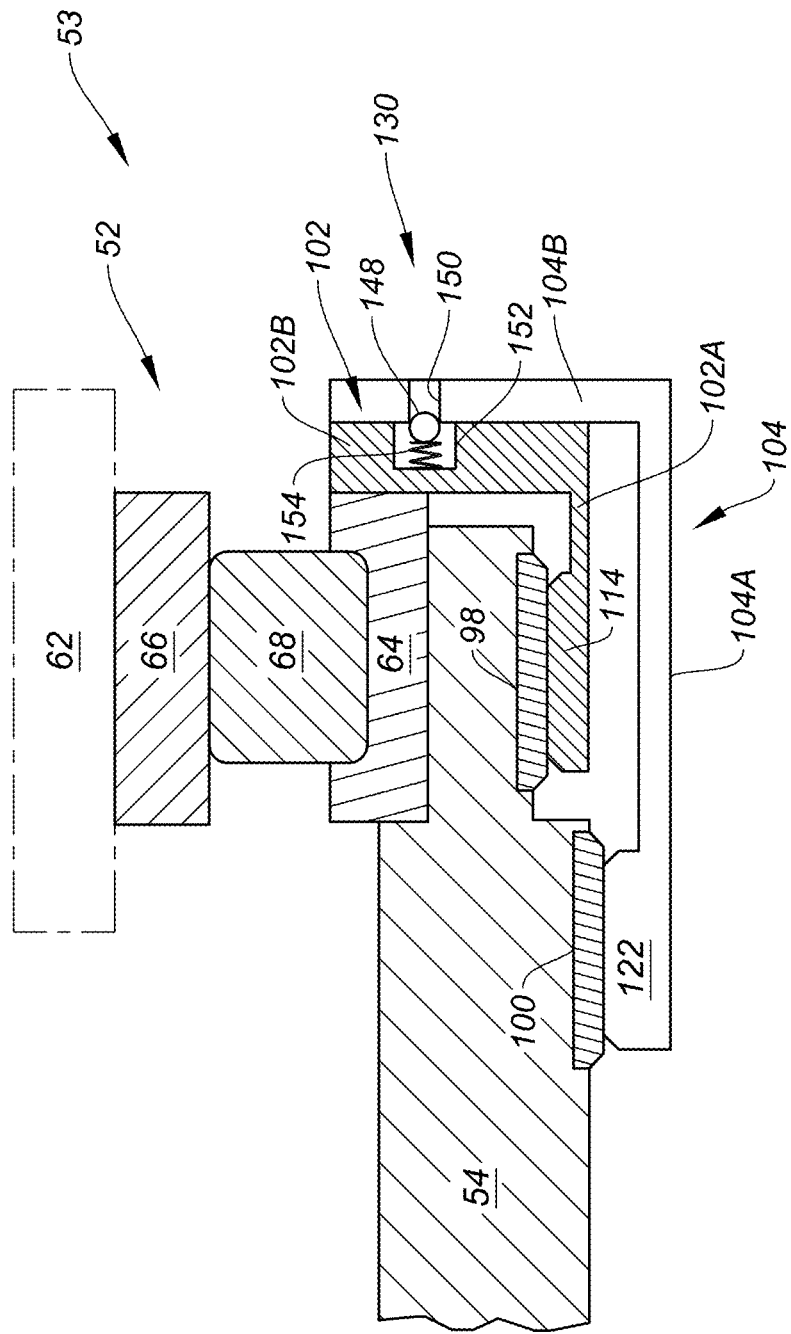
FIGS. 9-9B are diagrammatic views of a bearing mounted on a shaft with a present disclosure shaft bearing retainer assembly embodiment, including locking mechanism embodiments.
Figure 9A:
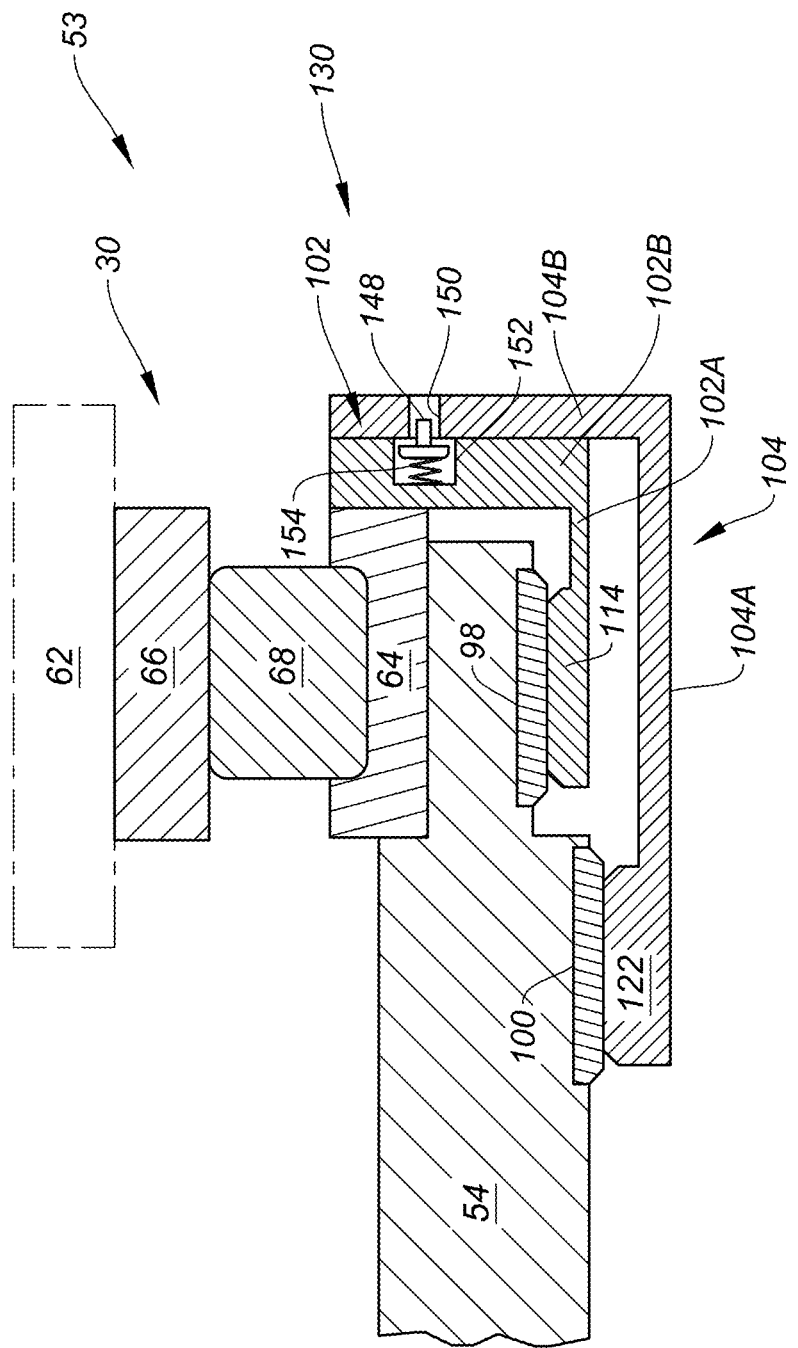

FIGS. 9-9B diagrammatically illustrate a present disclosure locking mechanism 130 embodiment that includes at least one biased detent member 148 engaged with the radial member 102B of the first retainer ring 102 and at least on detent member aperture 150 disposed in the radial member 104B of the second retainer ring 104. In FIG. 9, the detent member 148 has a spherical configuration (e.g., a spherical ball) and in FIG. 9A, the detent member 148 has a "T" shaped configuration. The present disclosure is not limited to these detent member 148 configurations. The detent member 148 is at least partially disposed in a pocket 152 within the radial member 102B of the first retainer ring 102. A biasing spring 154 is also disposed within the pocket 152 and is positioned to bias the detent member 148 toward the second retainer ring 104. The detent member aperture 150 and the detent member 148 are collectively configured such that a portion of the detent member 148 is able to extend into the second retainer ring 104 detent member aperture 150. When the portion of the detent member 148 extends into the detent member aperture 150, rotation of the second retainer ring 104 relative to the first retainer ring 102 (or vice versa) is inhibited or prevented.

To utilize this locking mechanism 130 embodiment, the first retainer ring 102 may be torqued relative to the shaft 54. Subsequently, a detent member 148 and a biasing spring 154 may be disposed in each first retainer ring pocket 152. The second retainer ring 104 may then be torqued relative to the shaft 54. The second retainer ring 104 is finally positioned so that the pockets 152 in the first retainer ring radial member 102B align with the detent members 148. Once aligned, a portion of each detent member 148 is biased into a respective detent member aperture 150. Thereafter, the detent members 148 inhibit or prevent relative movement between the first and second retainer rings 102, 104. Alternatively, the first and second retainer rings 102, 104 may be coupled (e.g., prior to torquing the first and second retainer rings 102, 104 onto the shaft 54) with a detent member 148 and a biasing spring 154 being disposed in each first retainer ring pocket 152. The first and second retainer rings 102, 104 may then be torqued relative to the shaft 54. When the appropriate amount of torque for the first retainer ring 102 is achieved, the second retainer ring 104 may be rotated relative to the first retainer ring 102 (i.e., either forward or backward) as required so that the detent members 148 are received within respective detent member apertures 150.

The locking mechanism 130 embodiment shown in FIG. 9B includes a retention plate 156 attached to the radial member 102B of the first retainer ring 102. The retention plate 156 maintains the biased detent members 148 within the first retainer ring pockets 152 during assembly. The retention plate 156 is configured to permit a portion of the detent members 148 sufficient to engage with the second retainer ring 104 detent member apertures 150 to extend outwardly beyond the retention plate 156. The retention plate 156 may be attached to the first retainer ring 102 by mechanical fasteners or by any other means.

Figure 10:
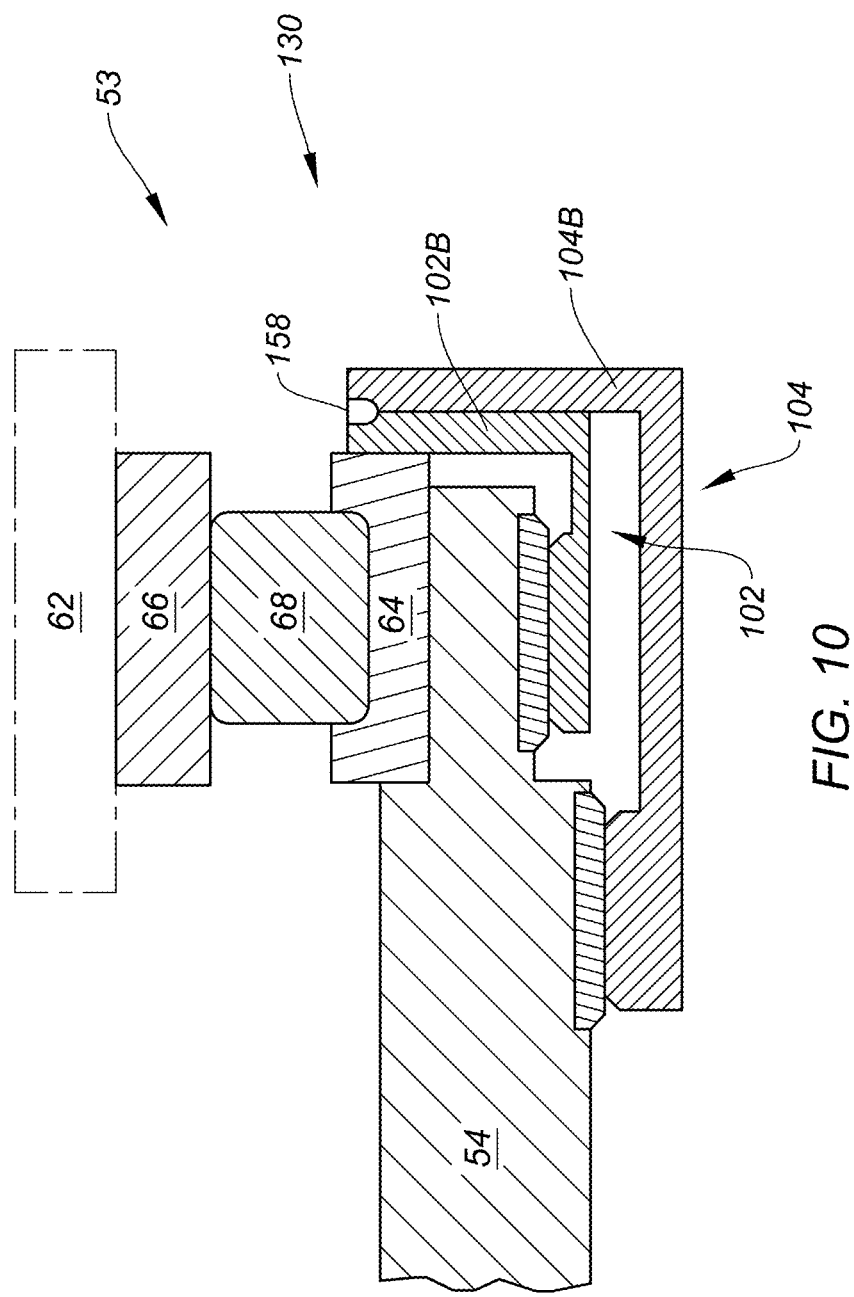
FIG. 10 is a diagrammatic view of a bearing mounted on a shaft with a present disclosure shaft bearing retainer assembly embodiment, including a locking mechanism embodiment.

FIG. 10 diagrammatically illustrates a present disclosure locking mechanism 130 embodiment wherein the radial member of the first retainer ring 102 and the second retainer ring 104 are attached to one another by spot weld 158 (or braze, or solder, or adhesive, or the like). To utilize this locking mechanism 130 embodiment, the first retainer ring 102 may be torqued relative to the shaft 54. Subsequently, the second retainer ring 104 may be torqued relative to the shaft 54. Once the first and second retainer rings 102, 104 are appropriately torqued, one or more spot welds 158 may be applied to the first and second retainer rings 102, 104 thereby bonding them together. Thereafter, the spot weld(s) 158 prevent relative movement between the first and second retainer rings 102, 104.

FIGS. 11-11B diagrammatically illustrate a present disclosure locking mechanism 130 embodiment that includes a first retainer ring 102 having a first set of deformable features 160A and a second retainer ring 104 having a second set of deformable features 160B. In some embodiments, one of the first retainer ring 102 or the second retainer ring 104 may have a set of deformable features and the other retainer ring 102, 104 may have a set of non-deformable features. This embodiment is described hereinafter as both retainer rings 102, 104 having deformable features but the present disclosure is not limited thereto. The first and second sets of deformable features 160A, 160B are configured to be elastically deformable when engaged with one another in a first direction, and configured to prevent relative motion when engaged with one another in a second direction, opposite the first direction. FIG. 11A diagrammatically illustrates the first retainer ring 102 and first set of deformable features 160A traveling in a first direction and the second retainer ring 104 and second set of deformable features 160B traveling in the opposite second direction. Of course, one of the first and second retainer rings 102, 104 may be stationary and the other moving to create the same relative movement. The first and second sets of deformable features 160A, 160B (shown as teeth-like structures, but not limited thereto) will deform to allow the depicted relative movement. FIG. 11B illustrates the first and second sets of deformable features 160A, 160B engaged with one another in a manner that prevents relative movement. The positioning between the first and second sets of deformable features 160A, 160B will occur within a short amount of relative travel in the direction opposite that shown in FIG. 11A. The configuration and orientation of the first and second sets of deformable features 160A, 160B shown in FIGS. 11A and 11B are provided for illustration purposes and are not intended to be limiting.

To utilize this locking mechanism 130 embodiment, the first retainer ring 102 may be torqued relative to the shaft 54. The second retainer ring 104 may then be torqued relative to the shaft 54. As the second retainer ring 104 draws toward the first retainer ring 102, the first and second sets of deformable features 160A, 160B engage with one another. One or both of the first and second sets of deformable features 160A, 160B deform and thereby permit the relative movement. Relative movement between the first and second retainer rings 102, 104 in the opposite direction is inhibited or prevented by the respective sets of deformable features 160A, 160B.

The above examples of locking mechanisms 130 are intended to illustrate the scope of the present disclosure and are not intended to be limiting.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible.

The invention claimed is:

1. A shaft bearing retainer assembly, comprising:
an axially extending shaft having a first radial surface, a second radial surface, a distal end, a bearing seat, and a retainer cavity, wherein the first radial surface is opposite the second radial surface, and the bearing seat is disposed in the first radial surface and extends axially inward from the distal end, and the retainer cavity is disposed in the second radial surface of the shaft and extends axially inward from the distal end;
wherein the shaft includes a first threaded surface portion disposed in the retainer cavity and a second threaded surface portion in the second radial surface;
a bearing having a race and a plurality of roller elements, wherein the bearing race is mounted in the bearing seat; and
a bearing retainer subassembly that includes a first retainer ring and a second retainer ring, and the first retainer ring is in threaded engagement with the first threaded surface portion and engaged with the bearing race, and the second retainer ring is in threaded engagement with the second threaded surface portion and engaged with the first retainer ring.

2. The shaft bearing retainer assembly of claim 1, wherein the threaded engagement between the first retainer ring and the first threaded surface portion is a first threaded engagement, and the threaded engagement between the second retainer ring and the second threaded surface portion is a second threaded engagement, and the first threaded engagement is different than the second threaded engagement.

3. The shaft bearing retainer assembly of claim 2, wherein the first threaded engagement has a first threads per inch value, and the second threaded engagement has a second threads per inch value, and the first threads per inch value is different than the second threads per inch value.

4. The shaft bearing retainer assembly of claim 2, wherein the first threaded engagement has a left-handed thread and the second threaded engagement has a right-handed thread, or the first threaded engagement has a right-handed thread and the second threaded engagement has a left-handed thread.

5. The shaft bearing retainer assembly of claim 2, wherein the first retainer ring (FRR) has a FRR axial member, a FRR radial member, and a FRR threaded collar, wherein the FRR threaded collar is disposed adjacent a first axial end of the FRR axial member and the FRR radial member extends radially out from the FRR axial member at a second axial end of the FRR axial member; and
wherein the FRR threaded collar is in threaded engagement with the first threaded surface portion.

6. The shaft bearing retainer assembly of claim 5, wherein the second retainer ring (SRR) has a SRR axial member, a SRR radial member, and a SRR threaded collar, wherein the SRR threaded collar is disposed adjacent a first axial end of the SRR axial member and the SRR radial member extends radially out from the SRR axial member at a second axial end of the SRR axial member; and wherein the SRR threaded collar is in threaded engagement with the second threaded surface portion.

7. The shaft bearing retainer assembly of claim 2, wherein the bearing seat (BS) includes an axially extending bearing mount surface and a BS shoulder surface, wherein the axially extending bearing mount surface extends from the distal end to the BS shoulder surface and the BS shoulder surface extends between the bearing mount surface and the first radial surface.

8. The shaft bearing retainer assembly of claim 2, wherein the bearing seat (BS) is defined by a shoulder protrusion extending outwardly from the first radial surface and a portion of the radial surface extending between the shoulder protrusion and the shaft distal end.

9. The shaft bearing retainer assembly of claim 2, wherein the retainer cavity (RC) includes an RC inner diameter surface and an RC shoulder surface, wherein the RC inner diameter surface extends from the distal end to the RC shoulder surface and the RC shoulder surface extends between the RC inner diameter surface and the second radial surface.

10. The shaft bearing retainer assembly of claim 1, further comprising a locking mechanism configured to inhibit relative rotation between the first retainer ring and the second retainer ring.

11. The shaft bearing retainer assembly of claim 10, wherein the locking mechanism includes at least one locking key engaged with the first retainer ring and the second retainer ring.

12. The shaft bearing retainer assembly of claim 10, wherein the locking mechanism includes at least one lock post extending out from the first retainer ring and a slotted aperture disposed in the second retainer ring.

13. The shaft bearing retainer assembly of claim 12, wherein the at least one lock post includes a stem and a head, and the slotted aperture includes a receiver portion and a slot portion, and the slotted aperture includes a stem locking feature.

14. The shaft bearing retainer assembly of claim 10, wherein the locking mechanism includes at least one mechanical fastener engaged with the first retainer ring and the second retainer ring.

15. The shaft bearing retainer assembly of claim 10, wherein the locking mechanism includes at least one biased detent member engaged between the first retainer ring and the second retainer ring.

16. The shaft bearing retainer assembly of claim 10, wherein the locking mechanism includes a deformable feature attached to one of the first retainer ring or the second retainer ring, the deformable feature configured to engage with the other of the first retainer ring or the second retainer ring to inhibit relative rotation between the first retainer ring and the second retainer ring.

17. The shaft bearing retainer assembly of claim 1, wherein the shaft first radial surface is an outer radial surface of the shaft, and the shaft second radial surface is an inner radial surface of the shaft, or the shaft first radial surface is an inner radial surface of the shaft, and the shaft second radial surface is an outer radial surface of the shaft.

18. A bearing assembly for a rotating shaft, the shaft having a first radial surface, a second radial surface, and a distal end, the first radial surface opposite the second radial surface, the bearing assembly comprising:
    a first threaded surface portion disposed at a first diameter on the second radial surface;
    a second threaded surface portion disposed at a second diameter on the second radial surface, wherein the first diameter is different than the second diameter;
    a bearing having a race and a plurality of roller elements, wherein the bearing race is mounted on the first radial surface; and
    a bearing retainer assembly that includes a first retainer ring and a second retainer ring, the first retainer ring in a first threaded engagement with the first threaded surface portion and engaged with the bearing race, and the second retainer ring in a second threaded engagement with the second threaded surface portion and engaged with the first retainer ring;
    wherein the first threaded engagement is different than the second threaded engagement.

19. The bearing assembly of claim 18, wherein the first threaded engagement has a first threads per inch value, and the second threaded engagement has a second threads per inch value, and the first threads per inch value is different than the second threads per inch value.

20. The bearing assembly of claim 18, wherein the first threaded engagement has a left-handed thread and the second threaded engagement has a right-handed thread, or the first threaded engagement has a right-handed thread and the second threaded engagement has a left-handed thread.

* * * * *